US012657675B2

(12) United States Patent
Namkung et al.

(10) Patent No.: US 12,657,675 B2
(45) Date of Patent: Jun. 16, 2026

(54) IMAGE PROCESSING APPARATUS AND METHOD OF OPERATING THE SAME

(71) Applicant: Samsung Electronics Co., Ltd., Suwon-si (KR)

(72) Inventors: Sol Namkung, Suwon-si (KR); Seungwon Choi, Suwon-si (KR); Jongseong Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 278 days.

(21) Appl. No.: 18/490,180

(22) Filed: Oct. 19, 2023

(65) Prior Publication Data

US 2024/0177280 A1 May 30, 2024

(30) Foreign Application Priority Data

Nov. 28, 2022 (KR) ........................ 10-2022-0162037

(51) Int. Cl.
*G06V 10/60* (2022.01)
*G06F 3/14* (2006.01)
(Continued)

(52) U.S. Cl.
CPC .................. *G06T 5/92* (2024.01); *G06F 3/14* (2013.01); *G06V 10/507* (2022.01); *G06V 10/60* (2022.01); *G06V 10/751* (2022.01)

(58) Field of Classification Search
CPC . G06T 2207/20012; G06T 2207/20208; G06T 5/94; G06T 5/90; H04N 5/202
See application file for complete search history.

(56) References Cited

U.S. PATENT DOCUMENTS 7,002,594 B2 2/2006 Yoshida et al.
8,358,351 B2 1/2013 Brunner et al.
(Continued)

FOREIGN PATENT DOCUMENTS

EP 2843937 B1 3/2016

OTHER PUBLICATIONS

K.-F. Yang, H. Li, H. Kuang, C.-Y. Li and Y.-J. Li, "An Adaptive Method for Image Dynamic Range Adjustment," in IEEE Transactions on Circuits and Systems for Video Technology, vol. 29, No. 3, pp. 640-652, Mar. 2019, doi: 10.1109/TCSVT.2018.2810212. (Year: 2019).*

(Continued)

*Primary Examiner* — Stephen R Koziol
*Assistant Examiner* — Ashley Hytrek
(74) *Attorney, Agent, or Firm* — Harness, Dickey & Pierce, P.L.C.

(57) ABSTRACT

An image processing apparatus includes a luminance calculator configured to convert input image data into luminance image data including luminance values of a plurality of pixels, a noise calculator configured to generate sum values obtained by adding noise values corresponding to neighboring pixels around a target pixel of the plurality of pixels, to the luminance values of the neighboring pixels, a tone mapper configured to generate first and second mapping data by applying a first tone curve and a second tone curve to a luminance value of the target pixel and the sum values of the neighboring pixels, a characteristic value calculator configured to calculate first and second weights for the first and second mapping data, a gain blender configured to adjust the first and second weights and generate output image data, and a display device configured to display the output image data.

19 Claims, 11 Drawing Sheets

(51) Int. Cl.

| | |
|---|---|
| *G06T 5/92* | (2024.01) |
| *G06V 10/50* | (2022.01) |
| *G06V 10/75* | (2022.01) |

(56) References Cited

U.S. PATENT DOCUMENTS

| | | | | |
|---|---|---|---|---|
| 8,538,145 | B2 | 9/2013 | Finlayson et al. | |
| 9,013,626 | B2 * | 4/2015 | Nakata | H04N 25/583 |
| | | | | 348/367 |
| 9,275,445 | B2 | 3/2016 | Granados et al. | |
| 2006/0071825 | A1 | 4/2006 | Demos | |
| 2008/0018800 | A1 | 1/2008 | Kodavalla | |
| 2008/0043120 | A1 | 2/2008 | Mitsunaga | |
| 2010/0085361 | A1 | 4/2010 | Kim et al. | |
| 2012/0093433 | A1 | 4/2012 | Gupta et al. | |
| 2012/0200744 | A1 | 8/2012 | Matsuoka | |
| 2023/0215131 | A1 * | 7/2023 | Shimura | G06T 5/92 |
| | | | | 382/274 |

OTHER PUBLICATIONS

Jeong, I., & Lee, C. (2021). An optimization-based approach to gamma correction parameter estimation for low-light image enhancement. Multimedia Tools and Applications, 80(12), 18027-18042. (Year: 2021).*

Han, Young Seok and Moon Gi Kang. "Image dynamic range coompression by combining gamma-corrected images." 23rd International Technical Conference on Circuits/Systems, Computers and Communications (ITC-CSCC 2008). Jul. 7, 2008.

Yang Kai-Fu et al: "An Adaptive Method for Image Dynamic Range Adjustment", IEEE Transactions on Circuits and Systems for Video Technology, IEEE, USA, vol. 29, No. 3, Mar. 1, 2019 (Mar. 1, 2019), pp. 640-652, XP011714239, ISSN: 1051-8215, DOI: 10.1109/TCSVT.2018.2810212 [retrieved on Mar. 7, 2019].

Fang Qianqian et al: "Endoscope Image Enhancement Algorithm Based on Pair of Complementary Gamma Functions", 2022 7th International Conference on Signal and Image Processing (ICSIP), IEEE, Jul. 20, 2022 (Jul. 20, 2022), pp. 486-492, XP034187444, DOI: 10.1109/ICSIP55141.2022.9887210 [retrieved on Sep. 19, 2020].

Jeong Inho et al: "An optimization-based approach to gamma correction parameter estimation for low-light image enhancement", Multimedia Tools and Applications, Kluwer Academic Publishers, Boston, US, vol. 80, No. 12, Feb. 13, 2021 (Feb. 13, 2021), pp. 18027-18042, XP037458384, ISSN: 1380-7501, DOI: 10.1007/S11042-021-10614-8 [retrieved on Feb. 13, 2021].

European Extended Search Report from corresponding European Application No. 23204177.2, dated Mar. 5, 2024.

* cited by examiner

FIG. 5

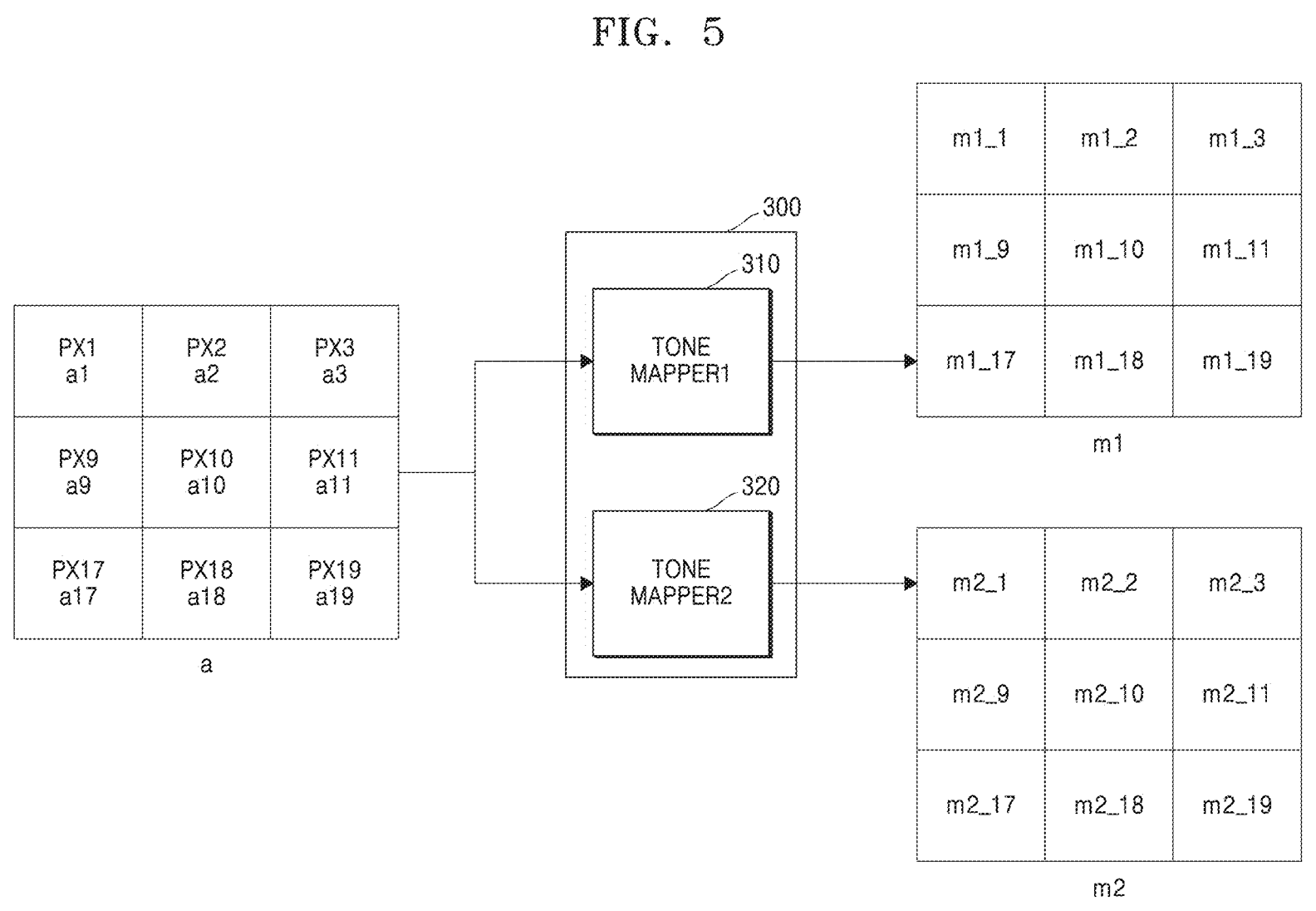

| m1_1 | m1_2 | m1_3 |
|------|------|------|
| m1_9 | m1_10 | m1_11 |
| m1_17 | m1_18 | m1_19 | m1

| m2_1 | m2_2 | m2_3 |
|------|------|------|
| m2_9 | m2_10 | m2_11 |
| m2_17 | m2_18 | m2_19 | m2

300

310 — TONE MAPPER1

320 — TONE MAPPER2

| PX1 a1 | PX2 a2 | PX3 a3 |
|--------|--------|--------|
| PX9 a9 | PX10 a10 | PX11 a11 |
| PX17 a17 | PX18 a18 | PX19 a19 | a

| PX1 | PX2 | PX3 | PX4 | PX5 | PX6 | PX7 | PX8 |
|-----|-----|-----|-----|-----|-----|-----|-----|
| PX9 | PX10 | PX11 | PX12 | PX13 | PX14 | PX15 | PX16 |
| PX17 | PX18 | PX19 | PX20 | PX21 | PX22 | PX23 | PX24 |
| PX25 | PX26 | PX27 | PX28 | PX29 | PX30 | PX31 | PX32 |
| PX33 | PX34 | PX35 | PX36 | PX37 | PX38 | PX39 | PX40 |
| PX41 | PX42 | PX43 | PX44 | PX45 | PX46 | PX47 | PX48 |
| PX49 | PX50 | PX51 | PX52 | PX53 | PX54 | PX55 | PX56 |
| PX57 | PX58 | PX59 | PX60 | PX61 | PX62 | PX63 | PX64 | yd

FIG. 10

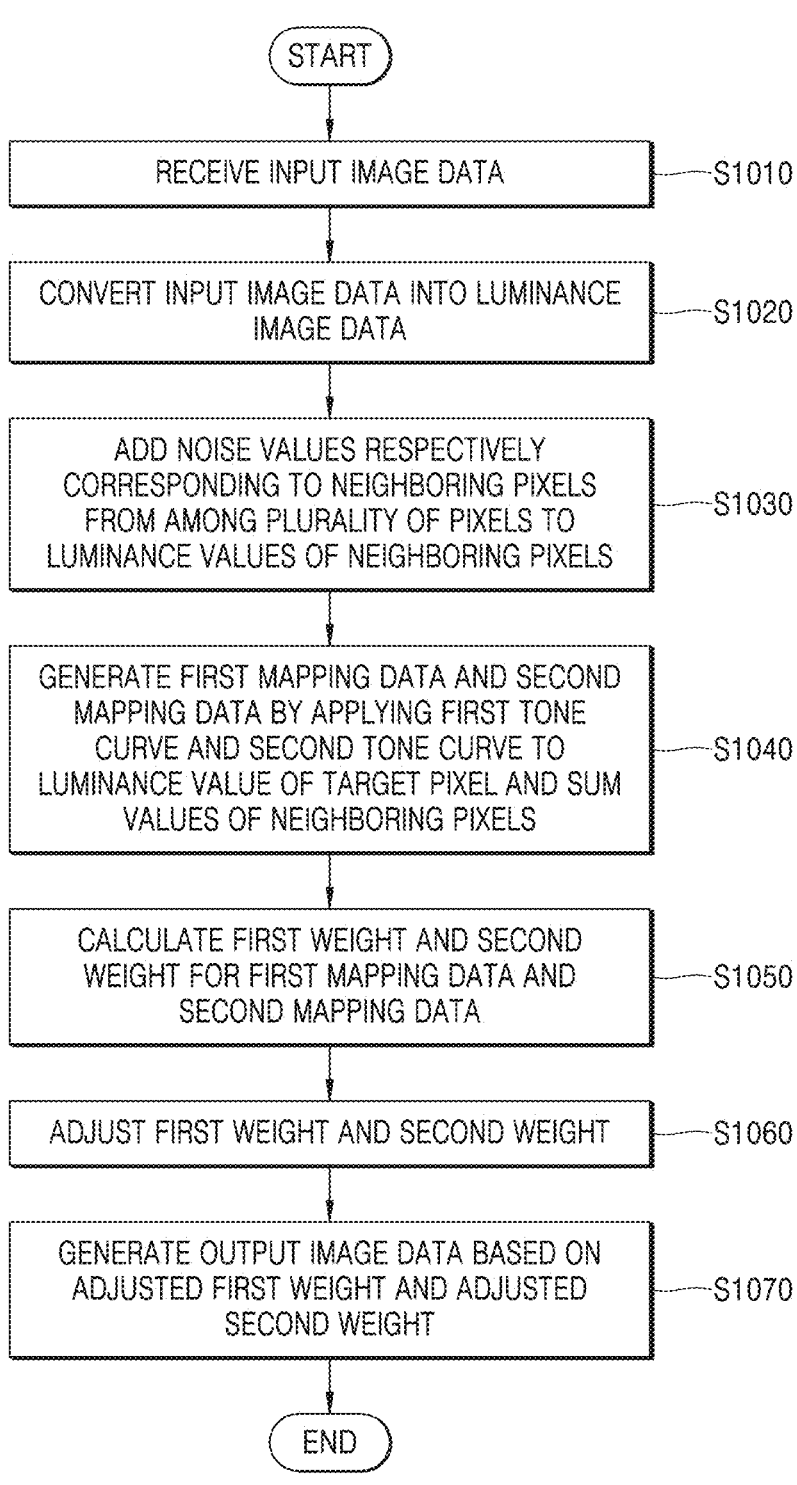

START

RECEIVE INPUT IMAGE DATA —S1010

CONVERT INPUT IMAGE DATA INTO LUMINANCE IMAGE DATA —S1020

ADD NOISE VALUES RESPECTIVELY CORRESPONDING TO NEIGHBORING PIXELS FROM AMONG PLURALITY OF PIXELS TO LUMINANCE VALUES OF NEIGHBORING PIXELS —S1030

GENERATE FIRST MAPPING DATA AND SECOND MAPPING DATA BY APPLYING FIRST TONE CURVE AND SECOND TONE CURVE TO LUMINANCE VALUE OF TARGET PIXEL AND SUM VALUES OF NEIGHBORING PIXELS —S1040

CALCULATE FIRST WEIGHT AND SECOND WEIGHT FOR FIRST MAPPING DATA AND SECOND MAPPING DATA —S1050

ADJUST FIRST WEIGHT AND SECOND WEIGHT —S1060

GENERATE OUTPUT IMAGE DATA BASED ON ADJUSTED FIRST WEIGHT AND ADJUSTED SECOND WEIGHT —S1070

END

IMAGE PROCESSING APPARATUS AND METHOD OF OPERATING THE SAME

CROSS-REFERENCE TO RELATED APPLICATION

This application claims priority under 35 U.S.C. § 119 to Korean Patent Application No. 10-2022-0162037, filed on Nov. 28, 2022, in the Korean Intellectual Property Office, the disclosure of which is incorporated by reference herein in its entirety.

FIELD

The inventive concepts relate to an image processing apparatus for performing an image processing operation and/or a method of operating the same, including an image processing apparatus for applying a sum value obtained by summing noise of input image data to a plurality of tone curves and/or a method of operating the same.

BACKGROUND

The luminance range of a display device is smaller than the luminance range perceptible by the human eye. There-fore, to display data having a wide dynamic range on a display device, an appropriate conversion technique regard-ing the data is desired or demanded. One of common conversion techniques is tone mapping.

The tone mapping is a technique used in image processing and computer graphics for mapping one set of colors to another set to approximate the appearance of high dynamic range images on a medium with limited dynamic range.

When a tone mapping operation is performed on image data by using one tone curve, the image data may be saturated, and information of a dark part and a bright part of the image data may be lost. When tone mapping is per-formed on image data, line-shaped defects may occur, and image quality may be deteriorated.

Therefore, a technique for outputting a high-quality image while minimizing defects during image processing like tone mapping of image data is desired or demanded.

SUMMARY

The inventive concepts provide an image processing apparatus and a method of operating the same for improving the quality of image data output from the image processing apparatus by applying noise to input image data, calculating weights for noise-applied image data, and generating output image data by using weights adjusted based on differences in luminance.

According to an aspect of the inventive concepts, an image processing apparatus includes a luminance calculator configured to convert input image data into luminance image data comprising luminance values of a plurality of pixels, a noise calculator configured to generate sum values obtained by adding noise values corresponding to neighboring pixels around a target pixel of the plurality of pixels, to the luminance values of the neighboring pixels, a tone mapper configured to generate first mapping data by applying a first tone curve to a luminance value of the target pixel and the sum values of the neighboring pixels, and the tone mapper configured to generate second mapping data by applying a second tone curve to the luminance value of the target pixel and the sum values of the neighboring pixels, a characteristic value calculator configured to calculate a first weight for the first mapping data of the target pixel and a second weight for the second mapping data of the target pixel, a gain blender configured to adjust the first weight and the second weight for the target pixel based on the target pixel and the neighboring pixels, and the gain blender configured to generate output image data based on an adjusted first weight and an adjusted second weight; and a display device con-figured to display the output image data based on the adjusted first weight and the adjusted second weight.

According to another aspect of the inventive concepts, an image processing apparatus includes a noise calculator con-figured to receive luminance image data comprising lumi-nance values of a plurality of pixels obtained by converting input image data, and sum noise values corresponding to locations of neighboring pixels around a target pixel of the plurality of pixels with luminance values corresponding to the neighboring pixels, to generate sum values, a gain blender configured to adjust a first weight of the target pixel generated based on applying a first tone curve to a luminance value of the target pixel and the sum values of the neigh-boring pixels, and a second weight of the target pixel generated based on applying a second tone curve to the luminance value of the target pixel and the sum values of the neighboring pixels, wherein the gain blender is configured to adjust the first weight and the second weight for the target pixel based on differences in luminance values between the target pixel and the neighboring pixels, and a display device configured to display the output image data based on the adjusted first weight and the adjusted second weight.

According to another aspect of the inventive concepts, a method of operating an image processing apparatus includes receiving input image data, converting the input image data into luminance image data comprising luminance values of a plurality of pixels, adding noise values corresponding to neighboring pixels located around a target pixel of the plurality of pixels to luminance values of the neighboring pixels, generating first mapping data and second mapping data by applying a first tone curve and a second tone curve to a luminance value of the target pixel and sum values of the neighboring pixels, calculating a first weight for the first mapping data of the target pixel and calculating a second weight for the second mapping data of the target pixel, adjusting the first weight based on the target pixel and adjusting the second weight based on the neighboring pixels, generating output image data based on the adjusted first weight and the adjusted second weight, and displaying, on a display device, the output image data based on the adjusted first weight and the adjusted second weight.

BRIEF DESCRIPTION OF THE DRAWINGS

Some example embodiments of the inventive concepts will be more clearly understood from the following detailed description taken in conjunction with the accompanying drawings in which:

FIG. 5 is a diagram for describing a tone mapper accord-ing to an example embodiment in detail;

FIG. 8 is a diagram for describing a method that an image processing apparatus calculates a final weight, according to an example embodiment;

FIG. 9 is a diagram for describing a method that an image processing apparatus calculates a final weight based on locations of pixels, according to an example embodiment;

FIG. 10 is a flowchart of a method of operating an image processing apparatus according to an example embodiment.

DETAILED DESCRIPTION

Figure 1:
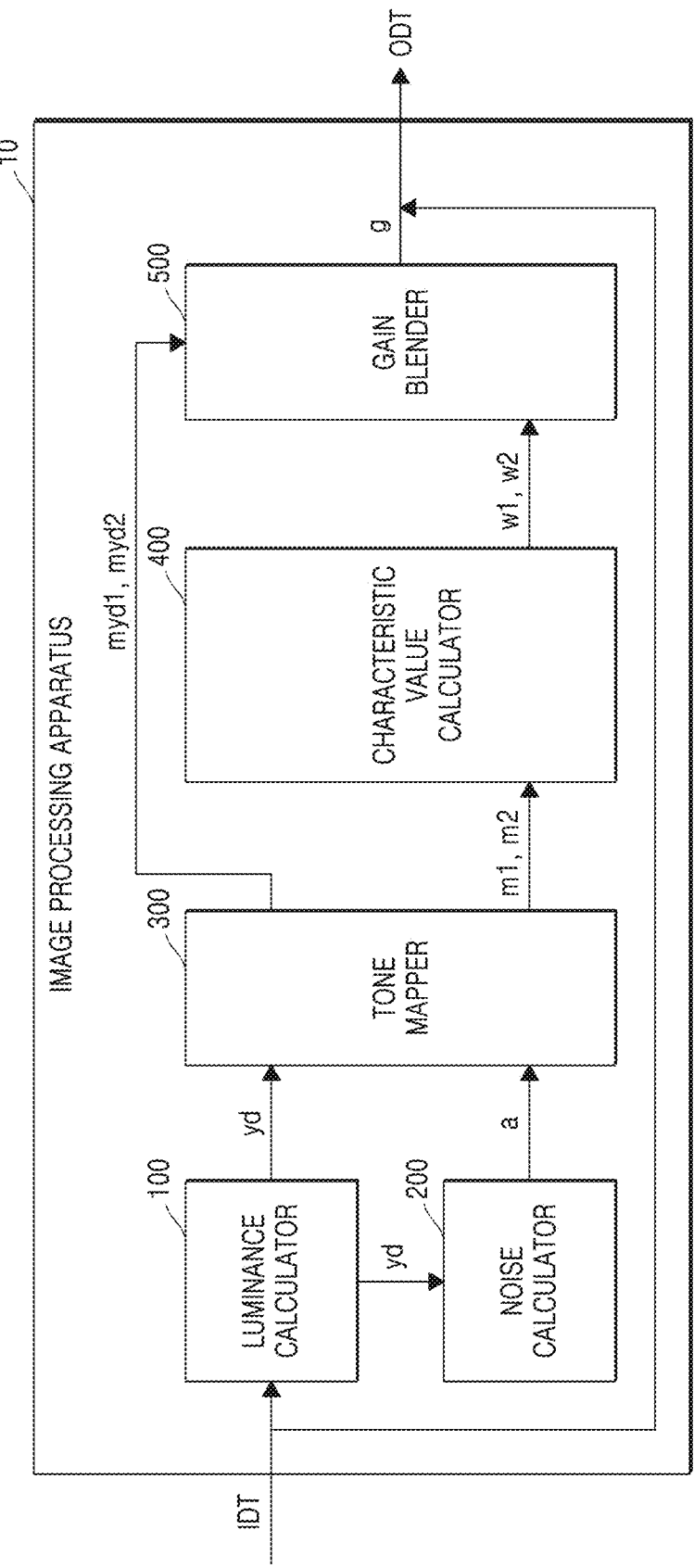
FIG. 1 is a block diagram showing an image processing apparatus according to an example embodiment.

FIG. 1 is a block diagram showing an image processing apparatus according to an example embodiment.

An image processing apparatus 10 may be implemented as an electronic device that captures an image, displays the captured image, or performs an operation based on the captured image. The image processing apparatus 10 may be embedded in an electronic device or implemented as an electronic device. The image processing apparatus 10 may be implemented as, for example, a personal computer (PC), an Internet of Things (IoT) device, or a portable electronic device. The portable electronic device may include a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc. Also, the image processing apparatus 10 may be installed on an electronic device like a drone, an advanced driver assistance system (ADAS), or an electronic device provided as a component of a vehicle, furniture, a manufacturing facility, a door, and various measuring devices, but example embodiments are not limited thereto.

The image processing apparatus 10 may be implemented by hardware, software (or firmware), or a combination of hardware and software (and/or firmware). The image processing apparatus 10 may be implemented as one of various types of processors capable of performing image processing, e.g., a GPU, a digital signal processor (DSP), and an image signal processor (ISP). The image processing apparatus 10 may be implemented as a single chip or embedded in an application processor (AP).

The image processing apparatus 10 may receive input image data IDT. In an example embodiment, the image processing apparatus 10 may receive the input image data IDT from an image sensor (not shown). The image sensor may include a color filter array (CFA) having a certain pattern, convert optical signals of an object incident through an optical lens into electrical signals by using the CFA, and generate and output the input image data IDT based on the electrical signals. Image data may be variously referred to as images, image frames, and frame data. The input image data IDT may be provided to the image processing apparatus 10 as input data.

According to an example embodiment, the input image data IDT may be RGB data. For example, the image sensor may convert image data having a Bayer pattern into RGB data including red, blue, and green channels by performing a demosaic operation on the image data. The image sensor may provide RGB data to the image processing apparatus 10 as the input image data IDT. According to another example embodiment, a pre-processor (not shown) may receive image data having a Bayer pattern from an image sensor and perform a demosaic operation on the image data having the Bayer pattern to convert the image data into RGB data. The pre-processor may provide RGB data to the image processing apparatus 10 as the input image data IDT.

The image processing apparatus 10 may receive the input image data IDT. The image processing apparatus 10 may perform an image processing operation on the input image data IDT. The image processing operation may include high dynamic range (HDR) processing. The image processing apparatus 10 may perform HDR processing on the input image data IDT and generate output image data ODT. The HDR processing may include at least one of linearization processing and dynamic range compression (DRC) processing. The DRC processing may include tone mapping (e.g., gamma correction). Due to the tone mapping, a relatively bright area of an image may be darkened and a relatively dark area may be brightened.

Referring to FIG. 1, the image processing apparatus 10 may include a luminance calculator 100, a noise calculator 200, a tone mapper 300, a characteristic value calculator 400, and a gain blender 500. The image processing apparatus 10 may further include other components in addition to the components shown in FIG. 1 as needed. For example, the image processing apparatus 10 may further include other components like a register, a display, and a user interface.

The luminance calculator 100 may receive the input image data IDT. The luminance calculator 100 may convert the input image data IDT into luminance image data yd. The luminance image data yd may include respective luminance values of a plurality of pixels. The luminance image data yd will be described later in detail with reference to FIG. 2.

The luminance calculator 100 may generate luminance image data yd by gray-scaling the input image data IDT. The luminance image data yd may include luminance values. The plurality of pixels may have luminance values respectively corresponding the plurality of pixels. Luminance values respectively corresponding to the plurality of pixels may also be referred to as respective luminance values of the plurality of pixels. A luminance value may also be referred to as a Y (e.g., luuma) value, a brightness value, etc. The luminance calculator 100 may transmit the luminance image data yd to the noise calculator 200. The luminance calculator 100 may transmit the luminance image data yd to the tone mapper 300.

The noise calculator 200 may add noise values respectively corresponding to neighboring pixels from among a plurality of pixels to respective luminance values of the neighboring pixels and generate sum values a. The neighboring pixels may refer to pixels positioned around a target pixel. The target pixel may refer to a pixel to be processed for image processing. Noise values respectively corresponding to a plurality of pixels may be pre-set. 'Pre-set' may include, for example, a value stored in an image processing device, such as noise values stored in an image processing device prior to the noise calculator 200 adding noise values to the pixels. According to an example embodiment, the noise calculator 200 may add noise values corresponding to positions of the neighboring pixels to the luminance values of the neighboring pixels, respectively.

The noise calculator 200 may sum noise values according to a filtering unit. For example, when the filtering unit is 3×3 pixels, a target pixel may be the pixel located at the center of the filtering unit, and the surrounding pixels may be 8 pixels surrounding the target pixel. The noise calculator 200 may add noise values respectively corresponding to 8 neighboring pixels and may add a noise value of 0 to the target pixel. In other words, the noise calculator 200 may add noise values only to the neighboring pixels.

The noise calculator 200 may generate the sum values a. The sum value a may include sums of values regarding the respective neighboring pixels. A sum value a is a value obtained by adding the noise value corresponding to a neighboring pixel to the luminance value of the corresponding neighboring pixels, and the sum value a may be generated for each of the neighboring pixels. The sum values a may include a sum value for the target pixel. Since the noise calculator 200 does not add a noise value for the target pixel, the sum value for the target pixel may be equal to the luminance value of the target pixel. The noise calculator 200 may also transmit the luminance value of the target pixel to the tone mapper 300. In other words, the luminance value of the target pixel may be transmitted to the tone mapper 300 as the sum value a of the target pixel. The noise calculator 200 may transmit the sum values a to the tone mapper 300.

The image processing apparatus 10 according to an example embodiment may normally perform an image processing operation on a flat surface, which is a region having a uniform luminance value in luminance image data, by summing noises corresponding to the respective neighboring pixels. Since defects occurring at the boundary of an image are reduced or minimized, a high-quality image may be obtained.

The tone mapper 300 may receive the luminance value of the target pixel and the sum values of the respective neighboring pixels from the noise calculator 200. The tone mapper 300 may receive the sum values a including the sum value of the target pixel, which is the luminance value of the target pixel, and the sum values of the respective neighboring pixels. The tone mapper 300 may apply a tone curve to the luminance value of the target pixel and the sum values of the respective neighboring pixels and generate mapping data. The tone curve may represent a correlation between input values and mapping data. The input values may include sum values and luminance values. The tone mapper 300 may obtain mapping data corresponding to input values based on the tone curve. The tone mapper 300 may apply a tone curve to the target pixel and at least one of the neighboring pixels. The tone mapper 300 may apply a tone curve to at least one pixel from among pixels included in a filtering unit.

The tone mapper 300 may apply a plurality of tone curves to the luminance value of the target pixel and the sum values of the respective neighboring pixels. According to an example embodiment, the tone mapper 300 may generate first mapping data m1 by applying a first tone curve to the luminance value of the target pixel and the sum values of the respective neighboring pixels. The tone mapper 300 may generate the first mapping data m1 of the target pixel by applying the first tone curve to the luminance value of the target pixel. The tone mapper 300 may generate the first mapping data m1 of each of the neighboring pixels by applying the first tone curve to the sum value of each of the neighboring pixels.

The tone mapper 300 may generate second mapping data m2 by applying a second tone curve to the luminance value of the target pixel and the sum values of the respective neighboring pixels. The tone mapper 300 may generate the second mapping data m2 of the target pixel by applying the second tone curve to the luminance value of the target pixel. The tone mapper 300 may generate the second mapping data m2 of each of the neighboring pixels by applying the second tone curve to the sum value of each of the neighboring pixels. The tone mapper 300 may transmit the first mapping data m1 and the second mapping data m2 to the characteristic value calculator 400.

According to an example embodiment, the first tone curve and the second tone curve may be different from each other. A gamma value of the first tone curve may be greater than a gamma value of the second tone curve. For example, the gamma value of the first tone curve may be greater than 1 and the gamma value of the second tone curve may be less than 1. When compared with an image to which the first tone curve is not applied, information regarding a dark area may be clearer in an image to which the first tone curve is applied. When compared with an image to which the second tone curve is not applied, information regarding a bright area may be clearer in an image to which the second tone curve is applied.

The tone mapper 300 may receive the luminance image data yd from the luminance calculator 100. The tone mapper 300 may apply a tone curve to the luminance image data yd and generate mapping data. The tone mapper 300 may apply a tone curve to at least one of respective luminance values of a plurality of pixels included in the luminance image data yd.

The tone mapper 300 may apply a plurality of tone curves to each of a plurality of pixels included in the luminance image data yd. In other words, the tone mapper 300 may apply a plurality of tone curves to the luminance value of each of a plurality of pixels. According to an example embodiment, the tone mapper 300 may generate a first mapping luminance value myd1 for each of the plurality of pixels by applying the first tone curve to the luminance value of each of the plurality of pixels. In detail, the tone mapper 300 may generate the first mapping luminance value myd1 of the target pixel by applying the first tone curve to the luminance value of the target pixel.

The tone mapper 300 may generate second mapping luminance values myd2 by applying the second tone curve to the luminance value of each of the plurality of pixels. The tone mapper 300 may generate a second mapping luminance value myd2 for the plurality of pixels by applying the second tone curve to the luminance value of each of the plurality of pixels. In detail, the tone mapper 300 may generate the second mapping luminance value myd2 of the target pixel by applying the second tone curve to the luminance value of the target pixel. The tone mapper 300 may transmit the first mapping luminance value myd1 and the second mapping luminance value myd2 to the gain blender 500.

The first mapping data m1 and the first mapping luminance value myd1 of the target pixel may be identical or substantially identical to each other. The second mapping data m2 and the second mapping luminance value myd2 of the target pixel may be identical to each other. The tone mapper 300 may not receive the luminance image data yd from the luminance calculator 100 and may be implemented to transmit the first mapping data m1 and the second mapping data m2 of the target pixel to the gain blender 500.

The characteristic value calculator 400 may calculate a weight for each of the plurality of pixels. The characteristic value calculator 400 may calculate a weight for each of the plurality of pixels by considering each of the plurality of pixels as a target pixel. The characteristic value calculator

400 may calculate a weight for a target pixel. The characteristic value calculator 400 may calculate a weight for a target pixel by using neighboring pixels.

The characteristic value calculator 400 may calculate a first weight w1 for the first mapping data m1 of the target pixel. The characteristic value calculator 400 may calculate the first weight w1 for the target pixel based on the first mapping data m1 of the target pixel and the neighboring pixels. In detail, the characteristic value calculator 400 may calculate a first variance of the target pixel based on the first mapping data m1 of each of the target pixel and the neighboring pixels and calculate the first weight w1 for the target pixel based on the first variance. The first weight w1 may refer to a weight for applying the first tone curve to the input image data IDT corresponding to the target pixel.

The characteristic value calculator 400 may calculate a second weight w2 for the second mapping data m2 of the target pixel. The characteristic value calculator 400 may calculate the second weight w2 for the target pixel based on the second mapping data m2 of each of the target pixel and the neighboring pixels. In detail, the characteristic value calculator 400 may calculate a second variance of the target pixel based on the second mapping data m2 of each of the target pixel and the neighboring pixels and calculate the second weight w2 for the target pixel based on the second variance. The second weight w2 may refer to a weight for applying the second tone curve to the input image data IDT corresponding to the target pixel. The characteristic value calculator 400 may transmit the first weight w1 and the second weight w2 for the target pixel to the gain blender 500.

The gain blender 500 may adjust the first weight w1 and the second weight w2. The gain blender 500 may generate the output image data ODT based on an adjusted first weight w1 and an adjusted second weight w2. In detail, the gain blender 500 may adjust the first weight w1 and the second weight w2 and blend the adjusted first weight w1 and the adjusted second weight w2 to generate an output gain g for generating the output image data ODT. The gain blender 500 may generate the output image data ODT by applying the output gain g to the input image data IDT.

The gain blender 500 may adjust the first weight w1 and the second weight w2 for the target pixel. The gain blender 500 may adjust the first weight w1 and the second weight w2 for the target pixel based on the target pixel and the neighboring pixels. The gain blender 500 may adjust the first weight w1 and the second weight w2 for the target pixel by using a box filter, a bilateral filter, etc.

When a boundary of an image is included in the target pixel and the neighboring pixels, a difference between luminance values of the target pixel and the neighboring pixels may be large due to the boundary of the image. Therefore, the variance and the weight value of the target pixels may increase, and thus defects may occur at the boundary of the image. The image processing apparatus 10 according to an example embodiment may reduce or minimize the occurrence of defects at the boundary of an image and generate a high-quality image by blurring the weight for a target pixel with the weight for neighboring pixels. A blurring processing may refer to adjustment of the weight for a target pixel.

The gain blender 500 may adjust the first weight w1 for the target pixel based on first weights w1 for the target pixel and the neighboring pixels. The gain blender 500 may generate a final first weight by adjusting the first weight w1 for the target pixel. The gain blender 500 may adjust weights that the first weight w1 of each of the neighboring pixels is involved in adjusting the first weight w1 for the target pixel.

The gain blender 500 may adjust the second weight w2 for the target pixel based on second weights w2 for the target pixel and the neighboring pixels. The gain blender 500 may generate a final second weight by adjusting the second weight w2 for the target pixel. The gain blender 500 may adjust weights that the second weight w2 of each of the neighboring pixels is involved in adjusting the second weight w2 for the target pixel.

According to an example embodiment, the gain blender 500 may adjust the first weight w1 and the second weight w2 for the target pixel based on a difference in luminance values between the target pixel and the neighboring pixels. The gain blender 500 may adjust weights of the first weight w1 and the second weight w2 of each of the neighboring pixels based on the difference in the luminance values between the target pixel and the neighboring pixels and generate the final first weight and the final second weight. For example, when the difference in luminance values between the target pixel and a first pixel is smaller than the difference in luminance values between the target pixel and a second pixel, the gain blender 500 may increase the weight of the first weight w1 of the first pixel and reduce the weight of the first weight w1 of the second pixel. The gain blender 500 may adjust weights of the first weight w1 of the first pixel and the second pixel and generate the final first weight for the target pixel by using first weights w1 of the first pixel and the second pixel.

According to an example embodiment, the gain blender 500 may adjust the first weight w1 and the second weight w2 for the target pixel based on a difference in locations between the target pixel and the neighboring pixels. The gain blender 500 may adjust weights of the first weight w1 and the second weight w2 of each of the neighboring pixels based on the difference in the locations between the target pixel and the neighboring pixels and generate the final first weight and the final second weight.

The gain blender 500 may generate the output image data ODT based on the final first weight and the final second weight. The output gain g for generating the output image data ODT may be generated by blending the final first weight and the final second weight. For example, the gain blender 500 may generate the output gain g based on the final first weight, the final second weight, the first mapping luminance value myd1 and the second mapping luminance value myd2 of the target pixel, and the luminance value of the target pixel. Although not shown in FIG. 1, the gain blender 500 may receive the luminance value of the target pixel from the luminance calculator 100.

The gain blender 500 may generate the output image data ODT by applying the output gain g to the input image data IDT. The output image data ODT may be image data obtained by performing tone mapping on the input image data IDT. For example, the output image data ODT may be image data obtained by performing global tone mapping on the input image data IDT.

The image processing apparatus 10 may perform detailed tone mapping by adjusting the weight for a target pixel and generating an output gain. The image processing apparatus 10 may generate high-quality images.

Figure 2:
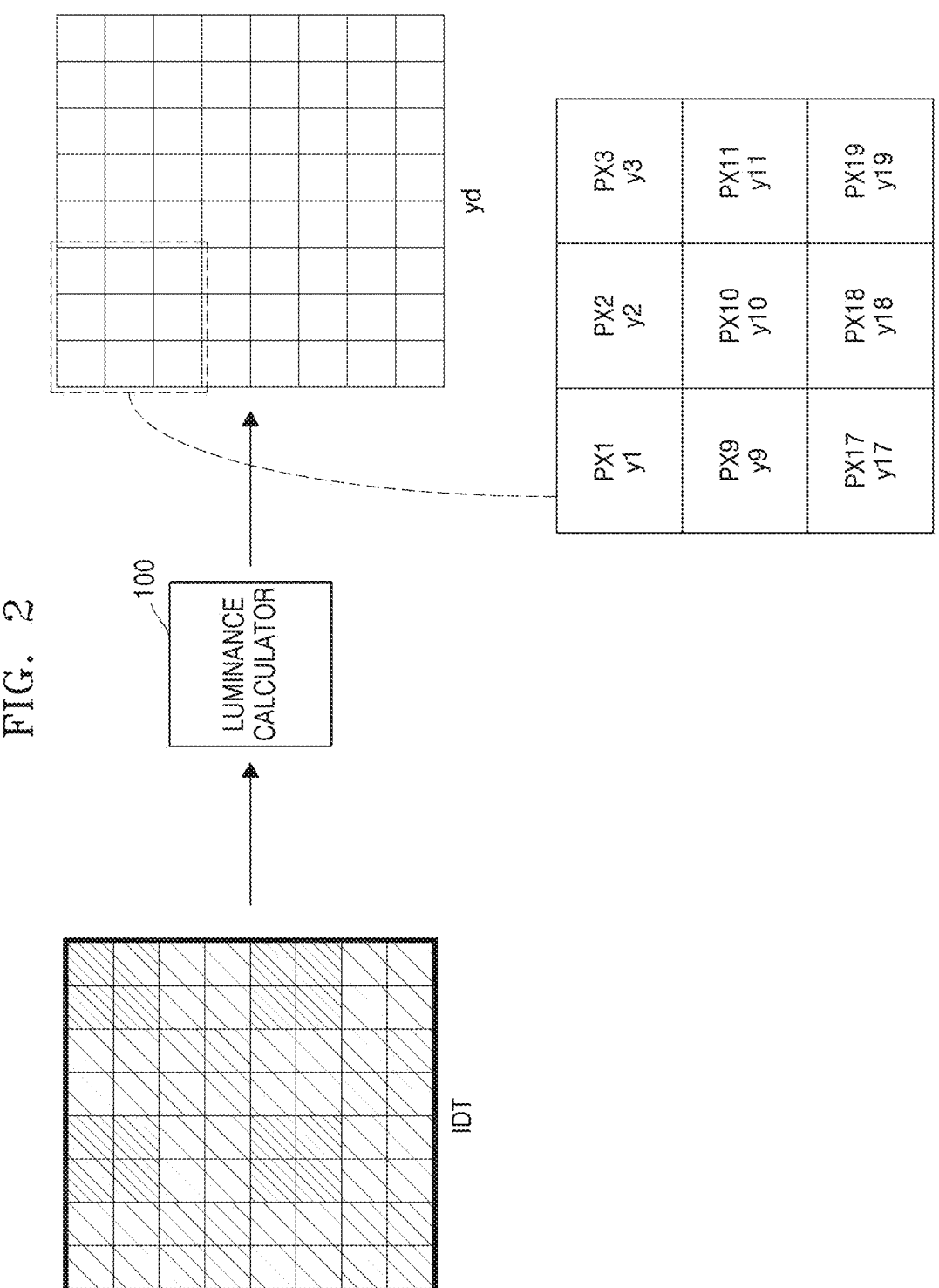
FIG. 2 is a diagram for describing a luminance calculator according to an example embodiment.

FIG. 2 is a diagram for describing a luminance calculator according to an example embodiment. Since the luminance calculator 100 of FIG. 2 corresponds to the luminance calculator 100 of FIG. 1, descriptions identical to those already given above will be omitted.

Referring to FIG. 2, the luminance calculator 100 may receive the input image data IDT. The input image data IDT may be RGB data. The input image data IDT may include pixel values constituting a frame. The pixel values included in the input image data IDT may correspond to a plurality of pixels constituting a frame, respectively. The pixel values included in the input image data IDT may correspond to luminance values of the plurality of pixels included in the luminance image data yd.

The luminance calculator 100 may generate luminance image data yd by gray-scaling the input image data IDT. In detail, the luminance calculator 100 may generate a luminance value of a pixel corresponding to a pixel value based on a sum of red data, green data, and blue data, which are pixel values of the input image data IDT.

The luminance image data yd may include respective luminance values of a plurality of pixels. The plurality of pixels may have luminance values respectively corresponding the plurality of pixels. Luminance values respectively corresponding to the plurality of pixels may also be referred to as respective luminance values of the plurality of pixels. For example, the luminance image data yd may include the first luminance value y1 of the first pixel PX1. The luminance image data yd may include the second luminance value y2 of the second pixel PX2. The luminance image data yd may include the third luminance value y3 of the third pixel PX3.

Figure 3:
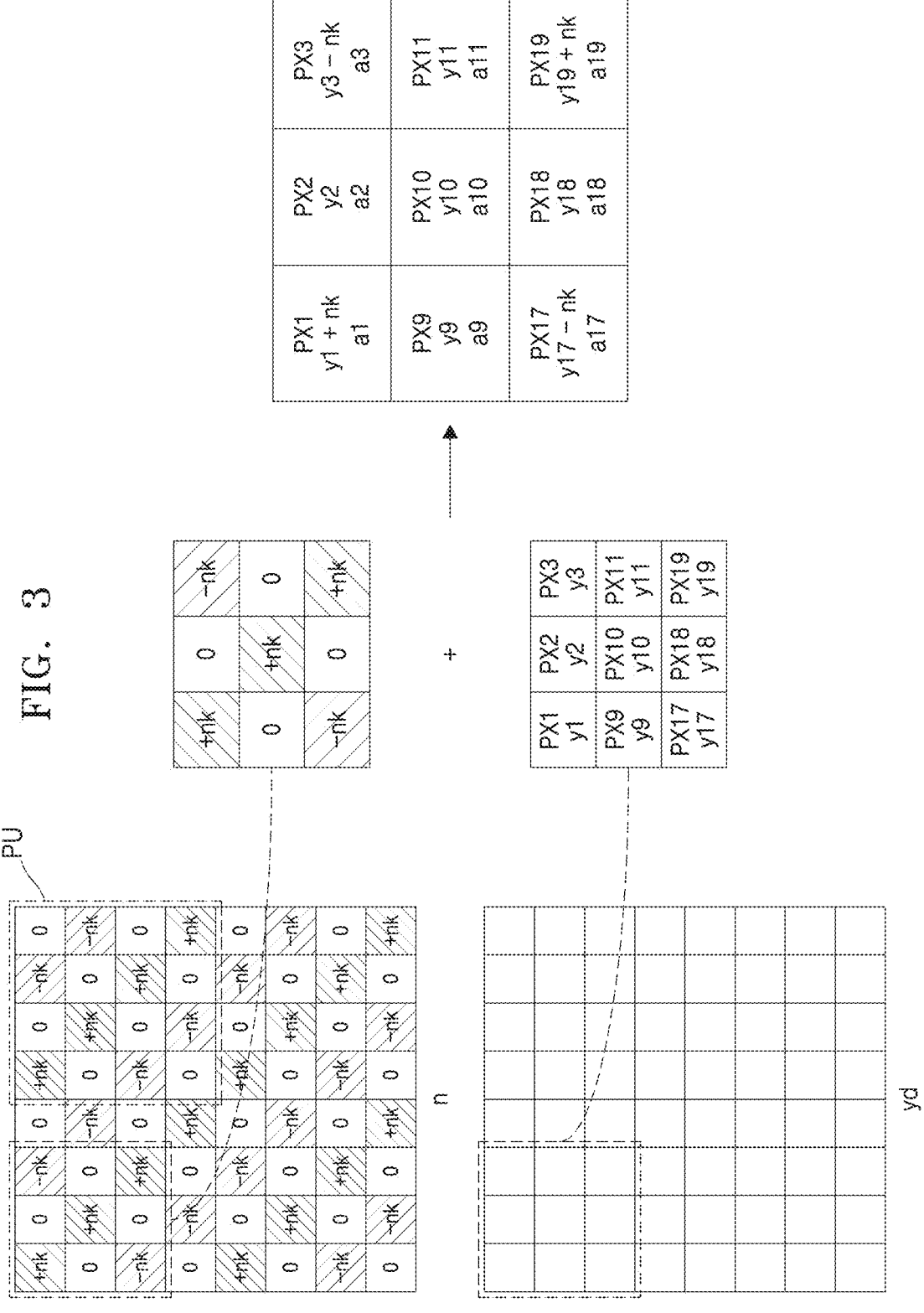
FIG. 3 is a diagram for describing a method of summing noise according to an example embodiment.

FIG. 3 is a diagram for describing a method of summing noise according to an example embodiment. In detail, FIG. 3 is a diagram for describing the noise calculator 200 of FIG. 1. The leftmost drawing of FIG. 3 shows the noise data n and the luminance image data yd, the middle drawing of FIG. 3 is a drawing for describing addition of noise values to luminance values, and the rightmost drawing of FIG. 3 is a drawing for describing that sum values are generated. Descriptions identical to those already given above will be omitted.

Referring to FIG. 3, the noise calculator may add noise values respectively corresponding to neighboring pixels from among a plurality of pixels to respective luminance values of the neighboring pixels and generate sum values. The target pixel may refer to a pixel to be processed for image processing. The neighboring pixels may refer to pixels positioned around a target pixel.

The neighboring pixels may include pixels surrounding the target pixel. For example, when the target pixel is a tenth pixel PX10, the neighboring pixel may include a first pixel PX1, a second pixel PX2, a third pixel PX3, a ninth pixel PX9, an eleventh pixel PX11, a seventeenth pixel PX17, an eighteenth pixel PX18, and a nineteenth pixel PX19. The neighboring pixels may also include pixels spaced apart from the target pixel and surrounding the target pixel. For example, when the target pixel is the third pixel PX3, the neighboring pixels may include the eleventh pixel PX11 and the nineteenth pixel PX19. The eleventh pixel PX11 may correspond to a neighboring pixel surrounding the third pixel PX3, and the nineteenth pixel PX19 may correspond to a neighboring pixel spaced apart from the third pixel PX3 and surrounding the third pixel PX3. An image processing apparatus (e.g., the image processing apparatus 10 of FIG. 1) may sum noise values of the target pixel and neighboring pixels to perform an image processing operation on the target pixel.

The noise calculator may sum noise values according to a filtering unit. The filtering unit may refer to a unit including the target pixel and the neighboring pixels. For example, when the filtering unit is 3×3 pixels, a target pixel may be the pixel located at the center of the filtering unit, and the surrounding pixels may be 8 pixels surrounding the target pixel. In other words, when the target pixel is the tenth pixel PX10, the neighboring pixels may be 8 pixels surrounding the tenth pixel PX10. The filtering unit is not necessarily limited to the above-stated example and may include various units other than the unit of 3×3 pixels.

Noise data n may represent noise values respectively corresponding to a plurality of pixels of the luminance image data yd. In other words, the noise data n is data schematized, such that noise values respectively corresponding to a plurality of pixels correspond to the plurality of pixels, respectively. Noise values may be pre-set to be repeated by noise pattern units PU. Referring to the noise data n, four noise pattern units PU (or more or less) may be included in one frame. A noise value corresponding to the location of a pixel may be pre-set.

Noise values may respectively correspond to locations of a plurality of pixels. The noise values may be pre-set. For example, a noise value corresponding to the location of the first pixel PX1 may be +nk. A noise value corresponding to the location of the second pixel PX2 may be zero. A noise value corresponding to the location of the third pixel PX3 may be −nk. A noise value corresponding to the location of the tenth pixel PX10 may be +nk. nk is an example for expressing a particular noise value, and a noise value may vary.

The noise calculator may add sum noise values respectively corresponding to neighboring pixels to respective luminance values of the neighboring pixels and generate sum values. It will be assumed below that the filtering unit is the unit of 3×3 pixels, although other example embodiments may use a different unit of pixels. When the target pixel is the tenth pixel PX10, a noise value corresponding to the first pixel PX1, which is a neighboring pixel, may be +nk. The noise calculator may add +nk to a first luminance value y1, which is the luminance value of the first pixel PX1, and generate a first sum value a1. A noise value corresponding to the second pixel PX2, which is a neighboring pixel, may be zero. The noise calculator may add 0 to a second luminance value y2 of the second pixel PX2 and generate a second sum value a2. A noise value corresponding to the third pixel PX3, which is a neighboring pixel, may be −nk. The noise calculator may add −nk to a third luminance value y3 of the third pixel PX3 and generate a third sum value a3. When the target pixel is a pixel located at an edge of image data, a noise value may be added to each of neighboring pixels by using zero padding, mirror padding, etc.

The noise calculator may not add a noise value corresponding to the target pixel to the luminance value of the target pixel. In other words, the noise calculator may add a noise value of 0 to the luminance value of the target pixel. The sum value of the target pixel may be identical to the luminance value of the target pixel. When the target pixel is the tenth pixel PX10, the noise calculator may generate a tenth sum value a10. The tenth sum value a10 may be identical to a tenth luminance value y10 of the tenth pixel PX10.

According to an example embodiment, a sum of noise values added to the luminance values of neighboring pixels may be zero. A noise value corresponding to the first pixel PX1 and the nineteenth pixel PX19, which are neighboring pixels, may be +nk. A noise value corresponding to the third pixel PX3 and the seventeenth pixel PX17, which are neighboring pixels, may be −nk. A noise value corresponding to the second pixel PX2, the ninth pixel PX9, the eleventh pixel PX11, and the eighteenth pixel PX18, which are neighboring pixels, may be zero. The sum of noise values respectively corresponding to the neighboring pixels may be zero.

When the target pixel is the eleventh pixel PX11, the neighboring pixels may include the second pixel PX2, the third pixel PX3, the tenth pixel PX10, the eighteenth pixel PX18, and the nineteenth pixel PX19. Since noise values respectively corresponding to the locations of the neighboring pixels are summed, a sum value of noise values corresponding to the second pixel PX2, the third pixel PX3, the eighteenth pixel PX18, and the nineteenth pixel PX19 when the target pixel is the eleventh pixel PX11 may be identical or substantially identical to that when the target pixel is the tenth pixel PX10. In other words, the second sum value a2, the third sum value a3, an eighteenth sum value a18, and a nineteenth sum value a19 may be the same or substantially the same even when the target pixel is changed from the tenth pixel PX10 to the eleventh pixel PX11. Therefore, when the target pixel is the eleventh pixel PX11, the sum value calculated when the target pixel is the tenth pixel PX10 may be used. In detail, the noise calculator may store the second sum value a2, the third sum value a3, the eighteenth sum value a18, and the nineteenth sum value a19 in an internal register of the image processing apparatus and read out and use stored sum values when an image processing operation is performed on the eleventh pixel PX11, which is the target pixel. Since noise values respectively corresponding to the locations of pixels are summed, the amount of calculation for summing the noise values may be reduced.

Figure 4:
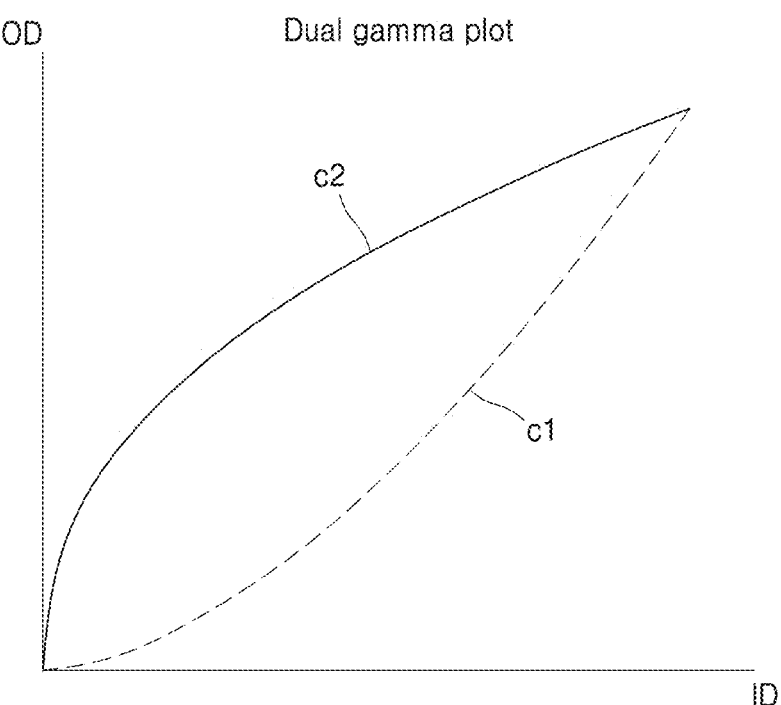
FIG. 4 is a graph for describing a tone curve according to an example embodiment.

FIG. 4 is a graph for describing a tone curve according to an example embodiment. The horizontal axis of the graph shown in FIG. 4 may represent input values ID, and the vertical axis may represent mapping data OD. Descriptions identical to those already given above will be omitted.

Referring to FIG. 4, a first tone curve c1 and a second tone curve c2 are shown. A tone curve may indicate a correlation between input values ID and the mapping data OD. An input value ID may be a sum value or a luminance value. The mapping data OD may be values for which gamma correction corresponding to the tone curve is performed. The first tone curve c1 and the second tone curve c2 may be different from each other.

According to an example embodiment, the gamma value of the first tone curve c1 may be greater than the gamma value of the second tone curve c2. A gamma value may refer to a value for adjusting the tone of an image. For example, the gamma value of the first tone curve c1 may be 3, and the gamma value of the second tone curve c2 may be 0.3. However, the gamma values of the first tone curve c1 and the second tone curve c2 are not limited thereto. When a luminance value is the input value ID, first mapping data to which the first tone curve c1 is applied may be smaller than second mapping data to which the second tone curve c2 is applied.

The gamma value of the first tone curve c1 may be greater than 1, and the gamma value of the second tone curve c2 may be less than 1. For example, the gamma value of the first tone curve c1 may be 1.6595, and the gamma value of the second tone curve c2 may be 0.43267. The gamma value of the first tone curve c1 may be 1.5, and the gamma value of the second tone curve c2 may be 0.5. However, the gamma value of the first tone curve c1 and the gamma value of the second tone curve c2 are not limited to the above-stated values. When compared to an image to which the first tone curve c1 is not applied, information regarding a dark area may be clearer in an image to which the first tone curve c1 is applied. When compared with an image to which the second tone curve c2 is not applied, information regarding a bright area may be clearer in an image to which the second tone curve c2 is applied.

FIG. 5 is a diagram for describing a tone mapper according to an example embodiment in detail. The tone mapper 300 of FIG. 5 may correspond to the tone mapper 300 of FIG. 1. Descriptions identical to those already given above will be omitted.

Referring to FIG. 5, the tone mapper 300 may receive sum values a. The sum values a may include sum values of the respective neighboring pixels and a sum value of a target pixel. The sum value of the target pixel may be identical or substantially identical to the luminance value of the target pixel. Although FIG. 5 shows sum values of some pixels from among a plurality of pixels, it is for describing the operation of the tone mapper 300 when the target pixel is the tenth pixel PX10, and the tone mapper 300 may operate the same or similar for other target pixels.

The tone mapper 300 may include a first tone mapper 310 and a second tone mapper 320. The first tone mapper 310 may apply a first tone curve to the luminance value of the target pixel and the sum values a of the respective neighboring pixels. The first tone mapper 310 may generate the first mapping data m1. Hereinafter, it will be assumed that the target pixel is the tenth pixel PX10.

The first tone mapper 310 may generate the first mapping data m1 of the target pixel by applying the first tone curve to the luminance value of the target pixel. The first tone mapper 310 may generate first mapping data m1_10 by applying the first tone curve to the luminance value of the tenth pixel PX10. Since the luminance value of the target pixel is identical or substantially identical to the sum value of the target pixel, the first tone mapper 310 may generate the first mapping data m1_10 by applying the first tone curve to the tenth sum value a10 of the tenth pixel PX10.

The first tone mapper 310 may generate the first mapping data m1 of each of the neighboring pixels by applying the first tone curve to the sum value a of each of the neighboring pixels. The first tone mapper 310 may generate first mapping data m1_1 by applying the first tone curve to the first sum value a1 of the first pixel PX1. The first tone mapper 310 may generate first mapping data m1_2 by applying the first tone curve to the second sum value a2 of the second pixel PX2. The first tone mapper 310 may generate first mapping data m1_9 by applying the first tone curve to a ninth sum value a9 of the ninth pixel PX9. The first tone mapper 310 may generate first mapping data m1_17 by applying the first tone curve to a seventeenth sum value a17 of the seventeenth pixel PX17.

The second tone mapper 320 may apply a second tone curve to the luminance value of the target pixel and the sum values a of the respective neighboring pixels. The second tone mapper 320 may generate the second mapping data m2. The second tone mapper 320 may generate the second mapping data m2 of the target pixel by applying the second tone curve to the luminance value of the target pixel. The second tone mapper 320 may generate second mapping data m2_10 by applying the second tone curve to the luminance value of the tenth pixel PX10. Since the luminance value of the target pixel is identical or substantially identical to the sum value of the target pixel, the second tone mapper 320 may generate the second mapping data m2_10 by applying the second tone curve to the tenth sum value a10 of the tenth pixel PX10.

The second tone mapper 320 may generate the second mapping data m2 of each of the neighboring pixels by applying the second tone curve to the sum value a of each of the neighboring pixels. The second tone mapper 320 may generate second mapping data m2_1 by applying the second tone curve to the first sum value a1 of the first pixel PX1. The second tone mapper 320 may generate second mapping data m2_2 by applying the second tone curve to the second sum value a2 of the second pixel PX2. The second tone mapper 320 may generate second mapping data m2_9 by applying the second tone curve to the ninth sum value a9 of the ninth pixel PX9. The second tone mapper 320 may generate second mapping data m2_17 by applying the second tone curve to the seventeenth sum value a17 of the seventeenth pixel PX17.

According to an example embodiment, a gamma value of the first tone curve may be greater than a gamma value of the second tone curve. First mapping data to which the first tone curve is applied may be smaller than second mapping data to which the second tone curve is applied. For example, the first mapping data m1_1 may be smaller than the second mapping data m2_1.

An image processing apparatus according to an example embodiment generates first mapping data and second mapping data by applying a first tone curve and a second tone curve to the sum value a, respectively, to thereby brighten a dark part of image data and reduce saturation of a bright part of the image data. Therefore, the image processing apparatus may effectively compress the dynamic range.

Figure 6:
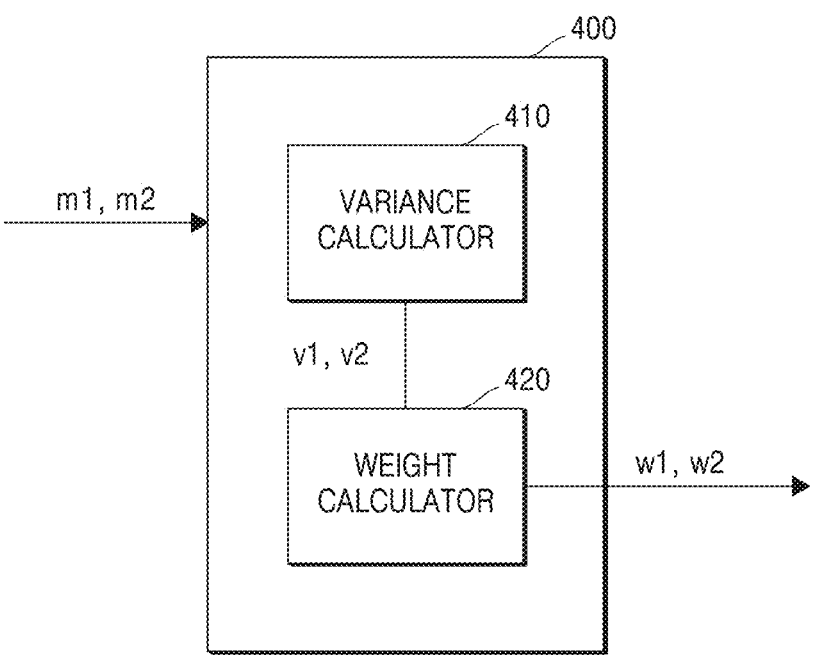
FIG. 6 is a block diagram for describing the operation of a characteristic value calculator according to an example embodiment in detail.

FIG. 6 is a block diagram for describing the operation of a characteristic value calculator according to an example embodiment in detail. The characteristic value calculator 400 of FIG. 6 may correspond to the characteristic value calculator 400 of FIG. 1. Descriptions identical to those already given above will be omitted.

Referring to FIG. 6, the characteristic value calculator 400 may receive the first mapping data m1 and the second mapping data m2. The characteristic value calculator 400 may receive the first mapping data m1 for each of neighboring pixels and a target pixel. The characteristic value calculator 400 may receive the second mapping data m2 for each of neighboring pixels and a target pixel. The characteristic value calculator 400 may include a variance calculator 410 and a weight calculator 420. Although FIG. 6 shows that the variance calculator 410 and the weight calculator 420 are implemented as separate logics, the inventive concepts are not limited thereto, and the variance calculator 410 and the weight calculator 420 may also be implemented as one logic.

The variance calculator 410 may calculate the variance of a target pixel based on mapping data. The variance calculator 410 may calculate the first variance v1 of the target pixel based on the first mapping data m1 of each of the target pixel and the neighboring pixels. Referring to FIGS. 5 and 6 together, the variance calculator 410 may calculate the first variance v1 of the tenth pixel PX10 based on the first mapping data m1_1, the first mapping data m1_2, first mapping data m1_3, the first mapping data m1_9, the first mapping data m1_10, first mapping data m1_11, first mapping data m1_17, first mapping data m1_18, and first mapping data m1_19.

The variance calculator 410 may calculate a second variance v2 of the target pixel based on the second mapping data m2 of each of the target pixel and the neighboring pixels. Referring to FIGS. 5 and 6 together, the variance calculator 410 may calculate the second variance v2 of the tenth pixel PX10 based on the second mapping data m2_1, the second mapping data m2_2, second mapping data m2_3, the second mapping data m2_9, the second mapping data m2_10, second mapping data m2_11, second mapping data m2_17, second mapping data m2_18, and second mapping data m2_19. The variance calculator 410 may transmit the first variance v1 and the second variance v2 of the target pixel to the weight calculator 420.

According to an example embodiment, the first variance v1 and the second variance v2 may be calculated according to Equation 1 below.

$$V1_p = \frac{1}{n} \sum_{q \in n_k} L1_q^2 - \left( \frac{1}{n} \sum_{q \in n_k} L1_q \right)^2 \qquad \text{[Equation 1]}$$

$$V2_p = \frac{1}{\omega} \sum_{q \in n_k} L2_q^2 - \left( \frac{1}{\omega} \sum_{q \in n_k} L2_q \right)^2$$

In Equation 1, V1 may denote the first variance V1 of a target pixel, and V2 may denote the second variance V2 of the target pixel. L1 may denote first mapping data, and L2 may denote second mapping data. p may denote a target pixel, q may denote the target pixel and neighboring pixels, and n may denote the number of the target pixel and neighboring pixels.

The weight calculator 420 may calculate a weight for each of the plurality of pixels. The weight calculator 420 may calculate a weight for each of the plurality of pixels by considering each of the plurality of pixels as a target pixel. The weight calculator 420 may calculate a weight for a target pixel. The weight calculator 420 may calculate a first weight w1 for the first mapping data m1 of the target pixel. The weight calculator 420 may calculate the first weight w1 for the target pixel based on the first variance v1 of the target pixel. The weight calculator 420 may calculate the first weight w1 for the target pixel based on the sum of the first variance v1 and the second variance v2 of the target pixel and the first variance v1 of the target pixel. According to an example embodiment, the first weight w1 may be calculated according to Equation 2 below.

$$w1 = v1/(v1+v2) \qquad \text{[Equation 2]}$$

In Equation 2, w1 may denote the first weight w1 of a target pixel, v1 may denote the first variance v1 of the target pixel, and v2 may denote the second variance v2 of the target pixel.

The weight calculator 420 may calculate a second weight w2 for the second mapping data m2 of the target pixel. The weight calculator 420 may calculate the second weight w2 for the target pixel based on the second variance v2 of the target pixel. The weight calculator 420 may calculate the second weight w2 for the target pixel based on the sum of the first variance v1 and the second variance v2 of the target pixel and the second variance v2 of the target pixel. According to an embodiment, the second weight w2 may be calculated according to Equation 3 below.

$$w2 = v2/(v1+v2) \qquad \text{[Equation 3]}$$

In Equation 3, w2 may denote the second weight w2 of a target pixel, v1 may denote the first variance v1 of the target pixel, and v2 may denote the second variance v2 of the target pixel.

The weight calculator 420 may output the first weight w1 and the second weight w2. The weight calculator 420 may transmit the first weight w1 and the second weight w2 to a gain blender (e.g., the gain blender 500 of FIG. 1).

Figure 7:
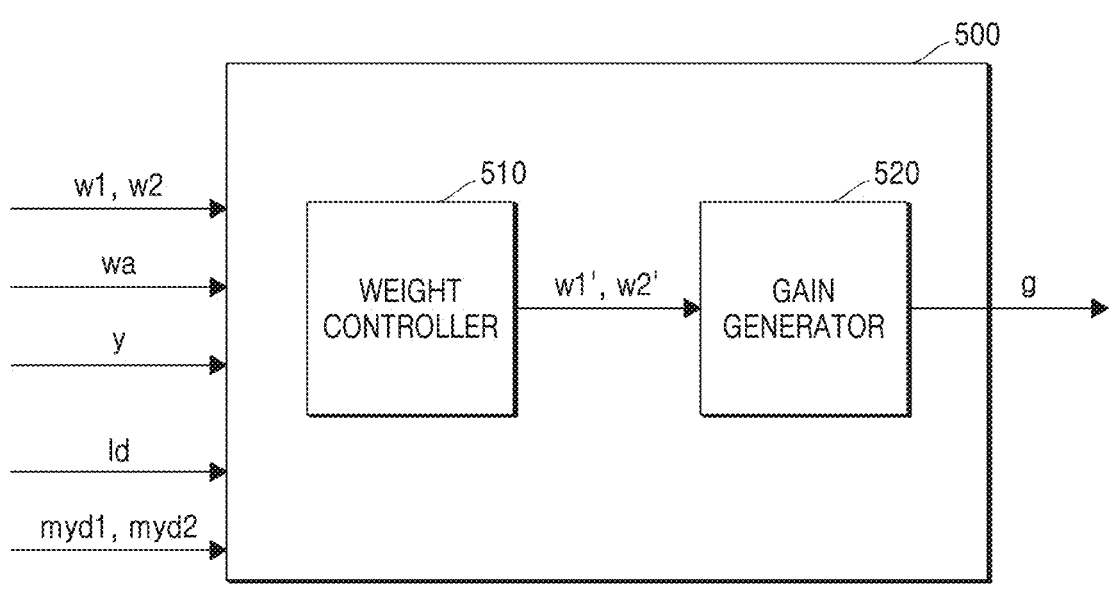
FIG. 7 is a block diagram for describing a detailed operation of a gain blender according to an example embodiment.

FIG. 7 is a block diagram for describing a detailed operation of a gain blender according to an example embodiment. The gain blender 500 of FIG. 7 may correspond to the gain blender 500 of FIG. 1. Descriptions identical to those already given above will be omitted.

The gain blender 500 may receive the first weight w1 and the second weight w2 for the target pixel. The gain blender 500 may receive a neighboring weight wa, which is the weight of each neighboring pixel. The neighboring weight wa may be a weight calculated when each of the neighboring pixels is a target pixel. The neighboring weight wa may include a first weight of each of the neighboring pixels and a second weight of each of the neighboring pixels. The gain blender 500 may receive the neighboring weight wa of each of the neighboring pixels from the characteristic value calculator or may receive the neighboring weight wa of each of the neighboring pixels from an internal register of the image processing apparatus in which the neighboring weight wa of each of the neighboring pixels is stored. The gain blender 500 may receive the first mapping luminance value myd1 and the second mapping luminance value myd2. For example, the gain blender 500 may receive the first mapping luminance value myd1 and the second mapping luminance value myd2 from the tone mapper (e.g., the tone mapper 300 of FIG. 1). The first mapping luminance value myd1 and the second mapping luminance value myd2 may refer to data to which a tone curve is applied without noise being applied to the luminance value of a target pixel.

The gain blender 500 may receive luminance values y of the target pixel and the neighboring pixels. The gain blender 500 may receive the luminance values y of the target pixel and the neighboring pixels from the luminance calculator 100 or from other components of an image processing apparatus. The gain blender 500 may receive location information ld of a plurality of pixels. The location information ld may refer to information indicating respective locations of a plurality of pixels in image data. The gain blender 500 may receive the luminance value y including the location information ld or may separately receive the location information ld.

Referring to FIG. 7, the gain blender 500 may include a weight controller 510 and a gain generator 520. The weight controller 510 may adjust the first weight w1 and the second weight w2. The weight controller 510 may adjust the first weight w1 and the second weight w2 of a target pixel. The weight controller 510 may adjust the first weight w1 and the second weight w2 for the target pixel based on the target pixel and the neighboring pixels.

The weight controller 510 may adjust the first weight w1 for the target pixel based on first weights w1 for the target pixel and the neighboring pixels. The weight controller 510 may generate a final first weight w1' by adjusting the first weight w1 of the target pixel. The weight controller 510 may adjust the second weight w2 for the target pixel based on second weights w2 for the target pixel and the neighboring pixels. The weight controller 510 may generate a final second weight w2' by adjusting the second weight w2 of the target pixel.

According to an example embodiment, the weight controller 510 may adjust the first weight w1 and the second weight w2 for the target pixel based on a difference in luminance values y between the target pixel and the neighboring pixels. The weight controller 510 may adjust the weight of the first weight w1 of each of the neighboring pixels based on the difference in luminance values y of the target pixel and each of the neighboring pixels. The weight controller 510 may generate the final first weight w1' for the target pixel by adjusting the weight of the first weight w1 of each of the neighboring pixels. The weight controller 510 may adjust the weight of the second weight w2 of each of the neighboring pixels based on the difference in luminance values y of the target pixel and each of the neighboring pixels and generate the final second weight w2'. A method where the weight controller 510 generates the final first weight w1' and the final second weight w2' based on the difference in luminance values y of the target pixel and the neighboring pixels will be described later with reference to FIG. 8.

According to an example embodiment, the weight controller 510 may adjust the first weight w1 and the second weight w2 for the target pixel based on a difference in luminance values and a difference in locations between the target pixel and the neighboring pixels. The weight controller 510 may obtain locations of the target pixel and the neighboring pixels based on the location information ld. The weight controller 510 may obtain a difference in locations between the target pixel and neighboring pixels based on the location information ld. The weight controller 510 may adjust the weight of the first weight w1 of each of the neighboring pixels based on the difference in luminance values and locations of the target pixel and each of the neighboring pixels and generate the final first weight w1'. The weight controller 510 may adjust the weight of the second weight w2 of each of the neighboring pixels based on the difference in luminance values and locations of the target pixel and each of the neighboring pixels and generate the final second weight w2'. The weight controller 510 may transmit the final first weight w1' and the final second weight w2' of the target pixel to the gain generator 520. A method where the weight controller 510 generates the final first weight w1' and the final second weight w2' based on the difference in luminance values y and locations of the target pixel and the neighboring pixels will be described later with reference to FIG. 9.

The gain generator 520 may generate the output gain g for generating the output image data ODT based on the final first weight w1' and the final second weight w2'. The gain generator 520 may generate the output gain g by blending the final first weight w1' and the final second weight w2'. The output gain g may indicate weights to which the first tone curve and the second tone curve are applied to a target pixel. The output gain g may be applied to input image data, and output image data may be generated. The output image data may be image data obtained by performing tone mapping on the input image data. For example, the output image data may be image data obtained by performing global tone mapping on the input image data.

According to an example embodiment, the gain generator 520 may generate the output gain g based on the final first weight w1', the final second weight w2', the luminance value y of the target pixel, the first mapping luminance value myd1 of the target pixel, and the second mapping luminance value myd2 of the target pixel. According to an example embodiment, the output gain g may be calculated according to Equation 4 below.

$$g = w1' * \frac{myd1}{yin} + w2' * \frac{myd2}{yin} \qquad \text{[Equation 4]}$$

In Equation 4, g may denote the output gain g for a target pixel, w1 may denote the final first weight w1', w2 may denote the final second weight w2', yin may denote the luminance value y of the target pixel, myd1 may denote the first mapping luminance value myd1 of the target pixel, and myd2 may denote the second mapping luminance value myd2 of the target pixel.

Figure 8:
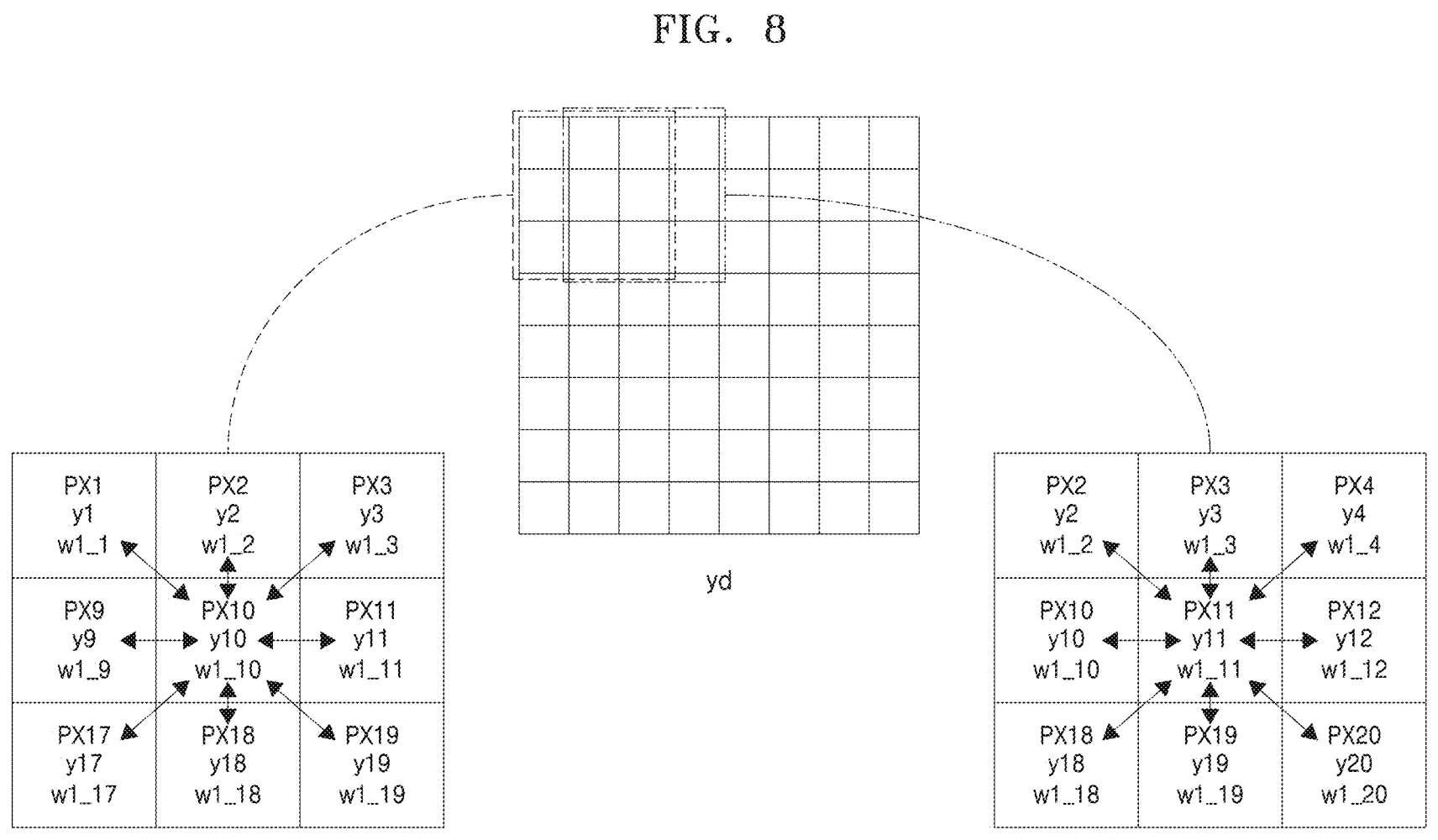

FIG. 8 is a diagram for describing a method where an image processing apparatus calculates a final weight, according to an example embodiment. The method described in FIG. 8 may be performed by the gain blender 500 of FIG. 7. In detail, the method described in FIG. 8 may be performed by the weight controller 510 of FIG. 7. Descriptions identical to those already given above will be omitted.

According to an example embodiment, the image processing apparatus may adjust a first weight and a second weight for the target pixel based on a difference in luminance values between a target pixel and neighboring pixels. The image processing apparatus may generate a final first weight for the target pixel by adjusting the weight of the first weight of each of the neighboring pixels. When the target pixel is the tenth pixel PX10, the image processing apparatus may compare the luminance value of the tenth pixel PX10 with the luminance value of each of the neighboring pixels. For example, the image processing apparatus may compare the tenth luminance value y10 with the first luminance value y1. The image processing apparatus may compare the tenth luminance value y10 with the second luminance value y2. The image processing apparatus may compare the tenth luminance value y10 with each of the third luminance value y3, a ninth luminance value y9, an eleventh luminance value y11, a seventeenth luminance value y17, an eighteenth luminance value y18, and a nineteenth luminance value y19.

When the target pixel is the eleventh pixel PX11, the image processing apparatus may compare the luminance value of the eleventh pixel PX11 with the luminance value of each of the neighboring pixels. For example, the image processing apparatus may compare the eleventh luminance value y11 with the second luminance value y2. The image processing apparatus may compare the eleventh luminance value y11 with each of the third luminance value y3, the fourth luminance value y4, the tenth luminance value y10, a twelfth luminance value y12, the eighteenth luminance value y18, the nineteenth luminance value y19, and a twentieth luminance value y20.

The image processing apparatus may adjust the weight of the first weight of each of the neighboring pixels based on a difference in luminance values between the target pixel and the neighboring pixels. For example, when the target pixel is the tenth pixel PX10 and the difference in luminance values between the tenth pixel PX10 and the first pixel PX1 is smaller than the difference in luminance between the tenth pixel PX10 and the seventeenth pixel PX17, the image processing apparatus may increase the weight of a first weight w1_1 of the first pixel PX1 and decrease the weight of the first weight w1_17 of the seventeenth pixel PX17.

In another example embodiment, when the target pixel is the eleventh pixel PX11 and the difference in luminance values between the eleventh pixel PX11 and the second pixel PX2 is smaller than the difference in luminance between the eleventh pixel PX11 and the eighteenth pixel PX18, the image processing apparatus may increase the weight of a first weight w1_2 of the second pixel PX2 and decrease the weight of the first weight w1_18 of the eighteenth pixel PX18.

When the difference in luminance values between the target pixel and a neighboring pixel is very large, the image processing apparatus may adjust the weight of the first weight of the corresponding neighboring pixel to 0. When the difference in luminance values between the target pixel and a neighboring pixel is equal to or greater than a pre-set value, the image processing apparatus may adjust the weight of the first weight of the corresponding neighboring pixel to 0. For example, when the target is the tenth pixel PX10 and the difference in luminance values between the tenth pixel PX10 and the nineteenth pixel PX19 is equal to or greater than a pre-set value, the image processing apparatus may adjust the weight of the first weight w1_19 of the nineteenth pixel PX19 to 0.

The image processing apparatus may adjust the first weight of each of the neighboring pixels and generate a final first weight for the target pixel based on the first weights of the target pixel and the neighboring pixels according to an adjusted weight. The image processing apparatus may generate the final second weight for the target pixel in the same manner as described above.

FIG. 9 is a diagram for describing a method that an image processing apparatus calculates a final weight based on locations of pixels, according to an example embodiment. The method described in FIG. 9 may be performed by the gain blender 500 of FIG. 7. In detail, the method described in FIG. 9 may be performed by the weight controller 510 of FIG. 7. Descriptions identical to those already given above will be omitted.

According to an example embodiment, the image processing apparatus may adjust a first weight and a second weight for the target pixel based on a difference in luminance values and locations between a target pixel and neighboring pixels. The image processing apparatus may obtain differences in locations between the target pixel and the neighboring pixels based on location information of the target pixel and the neighboring pixels. The image processing apparatus may compare luminance value of the target pixel with the luminance values of the neighboring pixels. In FIG. 9, it is assumed that the filtering unit is the unit of 5×5 pixels. When the target pixel is the nineteenth pixel PX19, the number of neighboring pixels may be 24.

When the target pixel is the nineteenth pixel PX19, the image processing apparatus may obtain a difference in locations between the nineteenth pixel PX19 and the eleventh pixel PX11, which is a neighboring pixel. The image processing apparatus may obtain a difference in locations between the nineteenth pixel PX19 and a twenty-first pixel PX21, which is a neighboring pixel. The image processing apparatus may obtain a difference in luminance values between the nineteenth pixel PX19 and the eleventh pixel PX11, which is a neighboring pixel. The image processing apparatus may obtain a difference in luminance values between the nineteenth pixel PX19 and the twenty-first pixel PX21, which is a neighboring pixel. When it is assumed that the differences in luminance values are the same or substantially the same, a distance between the nineteenth pixel PX19 and the eleventh pixel PX11 is smaller than a distance between the nineteenth pixel PX19 and the twenty-first pixel PX21, and thus the image processing apparatus may increase the weight of the first weight of the eleventh pixel PX11 greater than that of the first weight of the twenty-first pixel PX21.

When the target pixel is the nineteenth pixel PX19, the image processing apparatus may obtain a difference in locations between the nineteenth pixel PX19 and the twenty-first pixel PX21, which is a neighboring pixel. The image processing apparatus may obtain a difference in locations between the nineteenth pixel PX19 and a thirty-third pixel PX33, which is a neighboring pixel. The image processing apparatus may obtain a difference in luminance values between the nineteenth pixel PX19 and the twenty-first pixel PX21, which is a neighboring pixel. The image processing apparatus may obtain a difference in luminance values between the nineteenth pixel PX19 and the thirty-third pixel PX33, which is a neighboring pixel. When it is assumed that the differences in luminance values are the same or substantially the same, a distance between the nineteenth pixel PX19 and the twenty-first pixel PX21 is smaller than a distance between the nineteenth pixel PX19 and the thirty-third pixel PX33, and thus the image processing apparatus may increase the weight of the first weight of the twenty-first pixel PX21 greater than that of the first weight of the thirty-third pixel PX33.

The image processing apparatus may adjust the first weight of each of the neighboring pixels and generate a final first weight for the target pixel based on the first weights of the target pixel and the neighboring pixels according to an adjusted weight. The image processing apparatus may generate the final second weight for the target pixel in the same manner as described above.

According to an example embodiment, the final first weight may be calculated according to Equation 5 below.

$$w1' = \sum_q Gs(\|p - q\|)Gr(|Lp - Lq|)w1q \qquad \text{[Equation 5]}$$

In Equation 5, w1' may denote the final first weight of the target pixel. p may denote a target pixel, and q may denote the target pixel and neighboring pixels. w1 may denote a first weight. L may denote a luminance value. Gs may denote a spatial weight function. Gs may be a Gaussian function and may have a larger value as the distance between the target pixel and a neighboring pixel is smaller. Gr may denote a luminance weight function. Gr may be a Gaussian function and may have a larger value as the difference in luminance values between the target pixel and a neighboring pixel is smaller.

The final first weight may be generated based on differences in locations between the target pixel and the neighboring pixels, differences in luminance values between the target pixel and the neighboring pixels, and first weights of each of the target pixel and the neighboring pixels. The final second weight may be calculated in the same manner as the final first weight. The image processing apparatus may calculate the final first weight and the final second weight and generate an output gain. The image processing apparatus may output output image data by applying the output gain to input image data.

FIG. 10 is a flowchart of a method of operating an image processing apparatus according to an example embodiment.

In operation S1010, the image processing apparatus may receive input image data. According to an example embodiment, the image processing apparatus may receive the input image data from an image sensor. The input image data may be RGB data. The image processing apparatus may receive the input image data and perform an image processing operation on the input image data.

In operation S1020, the image processing apparatus may convert the input image data into luminance image data. The luminance image data may include respective luminance values of a plurality of pixels. A pixel may refer to a unit of an image expressing luminance. The plurality of pixels may have luminance values respectively corresponding to the plurality of pixels. The image processing apparatus may generate the luminance image data by gray-scaling the input image data.

In operation S1030, the image processing apparatus may add noise values corresponding to neighboring pixels from among the plurality of pixels to luminance values of the neighboring pixels, respectively. The image processing apparatus may generate sum values. The neighboring pixels may refer to pixels located around the target pixel, and the target pixel may refer to a pixel to be image-processed. Noise values respectively corresponding to a plurality of pixels may be pre-set. Noise values respectively corresponding to the locations of the neighboring pixels may be added to the luminance values of the respective neighboring pixels.

The image processing apparatus may add noise values respectively corresponding to neighboring pixels to respective luminance values of the neighboring pixels and generate sum values of the neighboring pixels. The image processing apparatus may add a noise value of 0 to the luminance value of the target pixel.

According to an example embodiment, a sum of noise values added to the luminance values of neighboring pixels may be zero. For example, when there are 8 neighboring pixels, the sum of 8 noise values respectively added to the luminance values of the 8 neighboring pixels may be zero. The image processing apparatus may normally perform an image processing operation on a flat surface by summing noises corresponding to respective neighboring pixels. Since defects occurring at the boundary of an image are reduced or minimized, a high-quality image may be obtained.

In operation S1040, the image processing apparatus may generate first mapping data and second mapping data by applying a first tone curve and a second tone curve to the luminance value of the target pixel and the sum values of the neighboring pixels, respectively. The image processing apparatus may generate first mapping data by applying a first tone curve to the luminance value of the target pixel and the sum values of the respective neighboring pixels. The image processing apparatus may generate second mapping data by applying a second tone curve to the luminance value of the target pixel and the sum values of the respective neighboring pixels.

According to an example embodiment, the first tone curve and the second tone curve may be different from each other. A gamma value of the first tone curve may be greater than a gamma value of the second tone curve. For example, the gamma value of the first tone curve may be greater than 1 and the gamma value of the second tone curve may be less than 1.

In operation S1050, the image processing apparatus may calculate a first weight and a second weight for the first mapping data and the second mapping data, respectively. The image processing apparatus may calculate a weight for each of the plurality of pixels by considering each of the plurality of pixels as a target pixel. The image processing apparatus may calculate the first weight for the target pixel based on the first mapping data of each of the target pixel and the neighboring pixels. The image processing apparatus may calculate the second weight for the target pixel based on the second mapping data of each of the target pixel and the neighboring pixels.

Operation S1050 may include calculating a first variance of the target pixel and calculating a second variance of the target pixel. The image processing apparatus may calculate the first variance of the target pixel based on the first mapping data of each of the target pixel and the neighboring pixels. The image processing apparatus may calculate the second variance of the target pixel based on the second mapping data of each of the target pixel and the neighboring pixels. The image processing apparatus may calculate the first weight for the target pixel based on the first variance of the target pixel. The image processing apparatus may calculate the second weight for the target pixel based on the second variance of the target pixel.

In operation S1060, the image processing apparatus may adjust the first weight and the second weight for the target pixel. The image processing apparatus may adjust the first weight for the target pixel based on first weights for the target pixel and the neighboring pixels. The image processing apparatus may adjust the second weight for the target pixel based on second weights for the target pixel and the neighboring pixels.

According to an example embodiment, the image processing apparatus may adjust a first weight and a second weight for the target pixel based on a difference in luminance values between a target pixel and neighboring pixels. The image processing apparatus may adjust weights of the first weight and the second weight of each of the neighboring pixels based on the difference in the luminance values between the target pixel and the neighboring pixels and adjust the first weight and the second weight for the target pixel.

According to an example embodiment, the image processing apparatus may adjust a first weight and a second weight for the target pixel based on a difference in locations and luminance values between a target pixel and neighboring pixels. The image processing apparatus may adjust weights of the first weight and the second weight of each of the neighboring pixels based on the difference in the locations and the luminance values between the target pixel and the neighboring pixels and adjust the first weight and the second weight for the target pixel.

In operation S1070, the image processing apparatus may generate output image data based on an adjusted first weight and an adjusted second weight. The image processing apparatus may generate an output gain by blending the adjusted first weight and the adjusted second weight. The image processing apparatus may generate output image data by applying the output gain to input image data. The output image data may be RGB data. The output image data may be image data obtained by performing global tone mapping on the input image data.

Figure 11:
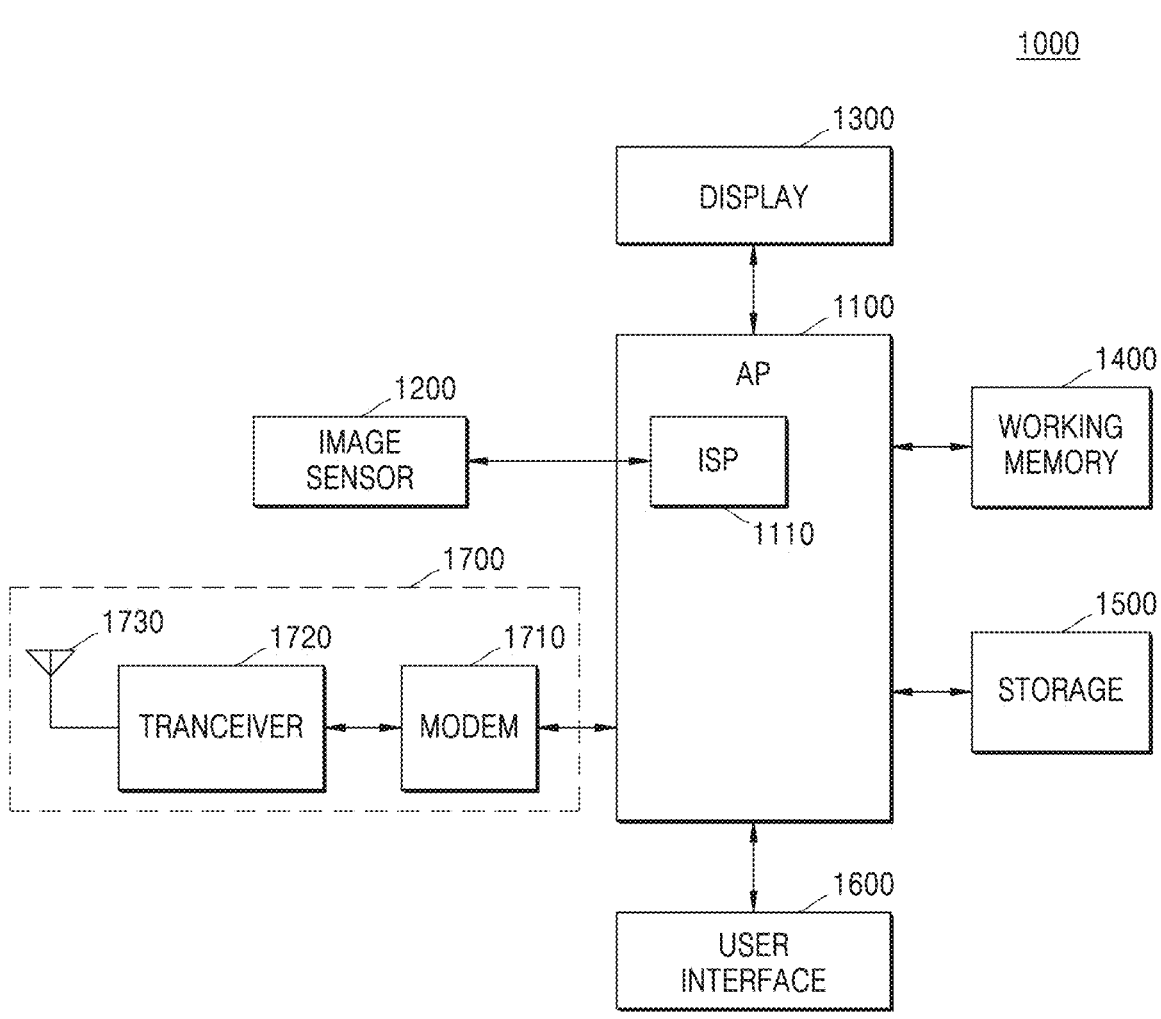
FIG. 11 is a block diagram of an electronic device according to an example embodiment of the inventive concepts.

FIG. 11 is a block diagram of an electronic device according to an example embodiment of the inventive concept. For example, an electronic device 1000 may be a portable terminal.

Referring to FIG. 11, the electronic device 1000 according to an example embodiment may include an application processor 1100, an image sensor 1200, a display device 1300, a working memory 1400, a storage 1500, a user interface 1600, and a wireless transceiver 1700, and wherein the application processor 1100 may include an image processing apparatus 1110. Descriptions of an image processing apparatus and a method of operating the image processing apparatus according to some example embodiments given above with reference to FIGS. 1 to 10 may be applied to the image processing apparatus 1110. According to an example embodiment, the image processing apparatus 1110 may be implemented as a separate integrated circuit from the application processor 1100.

The application processor 1100 controls the overall operation of the electronic device 1000 and may be implemented as a system-on-chip (SoC) that drives an application program, an operating system, etc.

The application processor 1100 may control the operation of the image processing apparatus 1110 and provide converted image data generated by the image processing apparatus 1110 to the display device 1300 or store the converted image data in the storage 1500.

The image sensor 1200 may generate image data, such as raw image data, based on a received optical signal and provide the raw image data to the image processing apparatus 1110.

The working memory 1400 may be implemented by a volatile memory like a dynamic random access memory (DRAM) or a static RAM (SRAM) or a non-volatile resistive memory like a ferroelectric RAM (FeRAM), a resistive RAM (RRAM), or a phase-change RAM (PRAM), but example embodiments are not limited thereto. The working memory 1400 may store programs and/or data processed or executed by the application processor 1100.

The storage 1500 may be implemented with a non-volatile memory device like a NAND flash or a resistive memory. For example, the storage 1500 may be provided as a memory card (an MMC, an eMMC, an SD, a micro SD, etc.). The storage 1500 may store data and/or programs regarding an execution algorithm that controls an image processing operation of the image processing apparatus 1110, and, when an image processing operation is performed, the data and/or the programs may be loaded to the working memory 1400. According to an example embodiment, the storage 1500 may store output image data generated by the image processing apparatus 1110, e.g., converted image data or post-processed image data.

The user interface 1600 may be implemented with various devices capable of receiving user inputs, e.g., a keyboard, a curtain key panel, a touch panel, a fingerprint sensor, a microphone, etc. The user interface 1600 may receive a user input and provide a signal corresponding to the received user input to the application processor 1100.

The wireless transceiver 1700 may include a transceiver 1710, a modem 1720, and an antenna 1730.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the scope of the inventive concepts.

What is claimed is:

1. An image processing apparatus comprising:
    a luminance calculator configured to convert input image data into luminance image data comprising luminance values of a plurality of pixels;
    a noise calculator configured to generate sum values obtained by adding noise values corresponding to locations of neighboring pixels around a target pixel of the plurality of pixels, to the luminance values of the neighboring pixels;
    a tone mapper configured to generate first mapping data by applying a first tone curve to a luminance value of the target pixel and the sum values of the neighboring pixels, and the tone mapper configured to generate second mapping data by applying a second tone curve to the luminance value of the target pixel and the sum values of the neighboring pixels;

a characteristic value calculator configured to calculate a first weight for the first mapping data of the target pixel and a second weight for the second mapping data of the target pixel;

a gain blender configured to adjust the first weight and the second weight for the target pixel based on the target pixel and the neighboring pixels, and the gain blender configured to generate output image data based on an adjusted first weight and an adjusted second weight; and a display device configured to display the output image data based on the adjusted first weight and the adjusted second weight.

2. The image processing apparatus of claim 1, wherein a sum of the noise values added to the luminance values of the neighboring pixels is zero.

3. The image processing apparatus of claim 1, wherein a gamma value of the first tone curve is greater than a gamma value of the second tone curve.

4. The image processing apparatus of claim 3, wherein the gamma value of the first tone curve is greater than or equal to one, and the gamma value of the second tone curve is less than one.

5. The image processing apparatus of claim 1, wherein the characteristic value calculator is configured to calculate a first variance of the target pixel based on the first mapping data of each of the target pixel and the neighboring pixels, and the characteristic value calculator is configured to calculate a second variance of the target pixel based on the second mapping data of each of the target pixel and the neighboring pixels.

6. The image processing apparatus of claim 5, wherein the characteristic value calculator is configured to calculate the first weight for the target pixel based on the first variance divided by a sum of the second variance and the first variance, and the characteristic value calculator is configured to calculate the second weight for the target pixel based on the second variance divided by the sum of the first variance and the second variance.

7. The image processing apparatus of claim 1, wherein the gain blender is configured to adjust the first weight for the target pixel based on the first weight of the target pixel and first weights of the neighboring pixels, and the gain blender is configured to adjust the second weight for the target pixel based on the second weight of the target pixel and second weights of the neighboring pixels.

8. The image processing apparatus of claim 1, wherein the gain blender is configured to adjust the first weight and the second weight based on differences in respective luminance values between the target pixel and the neighboring pixels.

9. The image processing apparatus of claim 1, wherein the gain blender is configured to adjust the first weight and the second weight based on differences in luminance values between the target pixel and the neighboring pixels and differences between locations of the target pixel and the neighboring pixels.

10. The image processing apparatus of claim 1, wherein the gain blender is configured to generate an output gain for generating the output image data based on the adjusted first weight and the adjusted second weight for the target pixel, and the gain blender is configured to generate the output image data by applying the output gain to the input image data.

11. An image processing apparatus comprising:

a noise calculator configured to receive luminance image data comprising luminance values of a plurality of pixels obtained by converting input image data, and sum noise values corresponding to locations of neighboring pixels around a target pixel of the plurality of pixels with luminance values corresponding to the neighboring pixels, to generate sum values;

a gain blender configured to adjust a first weight of the target pixel generated based on applying a first tone curve to a luminance value of the target pixel and the sum values of the neighboring pixels, and a second weight of the target pixel generated based on applying a second tone curve to the luminance value of the target pixel and the sum values of the neighboring pixels, wherein the gain blender is configured to adjust the first weight and the second weight for the target pixel based on differences in luminance values between the target pixel and the neighboring pixels; and a display device configured to display output image data based on the adjusted first weight and the adjusted second weight.

12. The image processing apparatus of claim 11, wherein a sum of the noise values corresponding to the locations of the neighboring pixels is zero.

13. The image processing apparatus of claim 11, wherein the gain blender is configured to adjust the first weight and the second weight based on differences in locations between the target pixel and the neighboring pixels.

14. The image processing apparatus of claim 11, further comprising a characteristic value calculator configured to calculate a first variance of the target pixel based on applying the first tone curve the luminance value of the target pixel and the sum values of the neighboring pixels, calculate a second variance of the target pixel based on applying the second tone curve to the luminance value of the target pixel and the sum values of the neighboring pixels, and generate the first weight and the second weight based on the first variance and the second variance.

15. A method of operating an image processing apparatus, the method comprising:

receiving input image data;

converting the input image data into luminance image data comprising luminance values of a plurality of pixels;

adding noise values corresponding to neighboring pixels located around a target pixel of the plurality of pixels to luminance values of the neighboring pixels;

generating first mapping data and second mapping data by applying a first tone curve and a second tone curve to a luminance value of the target pixel and sum values of the neighboring pixels;

calculating a first weight for the first mapping data of the target pixel and calculating a second weight for the second mapping data of the target pixel;

adjusting the first weight and the second weight based on the target pixel and the neighboring pixels;

generating output image data based on the adjusted first weight and the adjusted second weight; and displaying, on a display device, the output image data based on the adjusted first weight and the adjusted second weight.

16. The method of claim 15, wherein, in the adding of the noise values, noise values corresponding to locations of the neighboring pixels are added to the luminance values of the neighboring pixels.

17. The method of claim 15, wherein the calculating of the first weight and the second weight comprises:

calculating a first variance of the target pixel based on the first mapping data of each of the target pixel and the neighboring pixels; and calculating a second variance of the target pixel based on the second mapping data of each of the target pixel and the neighboring pixels.

18. The method of claim 15, wherein the adjusting of the first weight and the second weight comprises:

calculating a difference in respective luminance values between the target pixel and the neighboring pixels; and adjusting the first weight and the second weight based on the difference in the luminance values.

19. The method of claim 15, wherein the adjusting of the first weight and the second weight comprises:

calculating a difference in locations between the target pixel and the neighboring pixels; and adjusting the first weight and the second weight based on the difference in the locations.

* * * * *